United States Patent [19]

Morris, II

[11] Patent Number: 4,900,080
[45] Date of Patent: Feb. 13, 1990

[54] PARTIAL COVER FOR PICK-UP TRUCK BED

[75] Inventor: Clark W. Morris, II, Sacramento, Calif.

[73] Assignee: Gisele R. Kranjack-Morris, Sacramento, Calif. ; a part interest

[21] Appl. No.: 316,146

[22] Filed: Feb. 27, 1989

[51] Int. Cl.⁴ .............................................. B60P 7/02
[52] U.S. Cl. ................................... 296/100; 296/37.6; 296/180.1
[58] Field of Search ...................... 296/100, 39.1, 39.3, 296/24.1, 37.6, 180.1; 224/273, 42.43, 42.44

[56] References Cited

U.S. PATENT DOCUMENTS

| 4,451,075 | 5/1984 | Canfield | 296/180.1 X |
| 4,717,196 | 1/1988 | Adams | 296/100 X |
| 4,749,226 | 6/1988 | Heft | 296/37.6 X |
| 4,813,735 | 3/1989 | Avitable | 296/180.1 X |

Primary Examiner—Margaret A. Focarino
Assistant Examiner—Obele Acha-Ngwodo
Attorney, Agent, or Firm—Mark C. Jacobs

[57] ABSTRACT

A partial cover for pick-up truck beds having a plurality of longitudinal exterior grooves extending from front to rear of the cover. The cover covers the full width of the bed and part of the length from the cab to a mid portion of the bed and is coupled at one end of the truck adjacent the cab extending toward the rear of the truck where it may rest on the wheel well or optional supporting brackets. A rear spoiler is provided across the width of the cover for stability. An optional water curtain may be provided.

16 Claims, 4 Drawing Sheets

PARTIAL COVER FOR PICK-UP TRUCK BED

BACKGROUND OF THE INVENTION

1. Field of the Invention

The invention relates to a partial cover for the bed of a pick-up truck.

2. Description of the Prior Art

Pick-up trucks usually have open beds which require protection from the elements when cargo or the like is transported in the bed of the truck. It is not only inconvenient to cover such cargo with canvas or the like but such is cumbersome to use and still may result in rain water or other elements reaching the cargo. Of course, solid detachable modular units are known for attachment to pick-up trucks for covering the entire beds thereof. However, such units are quite expensive, require a large storage area, and are difficult to maneuver.

There is a need for an inexpensive and easy to use partial cover for protecting small loads of cargo in a pick-up truck bed from rain, snow, sun, etcetera without the need for covering the entire truck bed while protecting the cargo underneath the cover. Such a cover should be inexpensive, easy to install, and easy to disinstall, and should enhance the appearance of the truck bed and provide easy access to cargo under the cover.

SUMMARY OF THE INVENTION

It is an object of the invention to provide a partial cover for covering the front portion of a pick-up truck bed protecting any cargo under such cover from the elements.

It is further object of this invention to provide such a cover which has a continuous drip lip around its perimeter and rear spoiler to keep the cover from flagging during travel of the truck.

It is still another object of this invention to provide such a cover that is easily adaptable to various widths of pick-up truck beds, is easy to install, and disinstall provides easy access to the cargo on the bed and enhances the overall appearance of the truck bed.

It is a further object of this invention to provide a cover that can be manufactured in a single size only and is rugged in construction.

These and other objects of the invention are preferably accomplished by providing a cover that covers the entire width of the bed of the truck from the cab to a mid length portion thereof and is coupled at one end to the truck adjacent the cab extending to the rear of the truck where it may rest on the wheel well or optional supporting brackets. An optional water curtain may be provided.

DESCRIPTION OF THE PREFERRED EMBODIMENT

Figure 1:
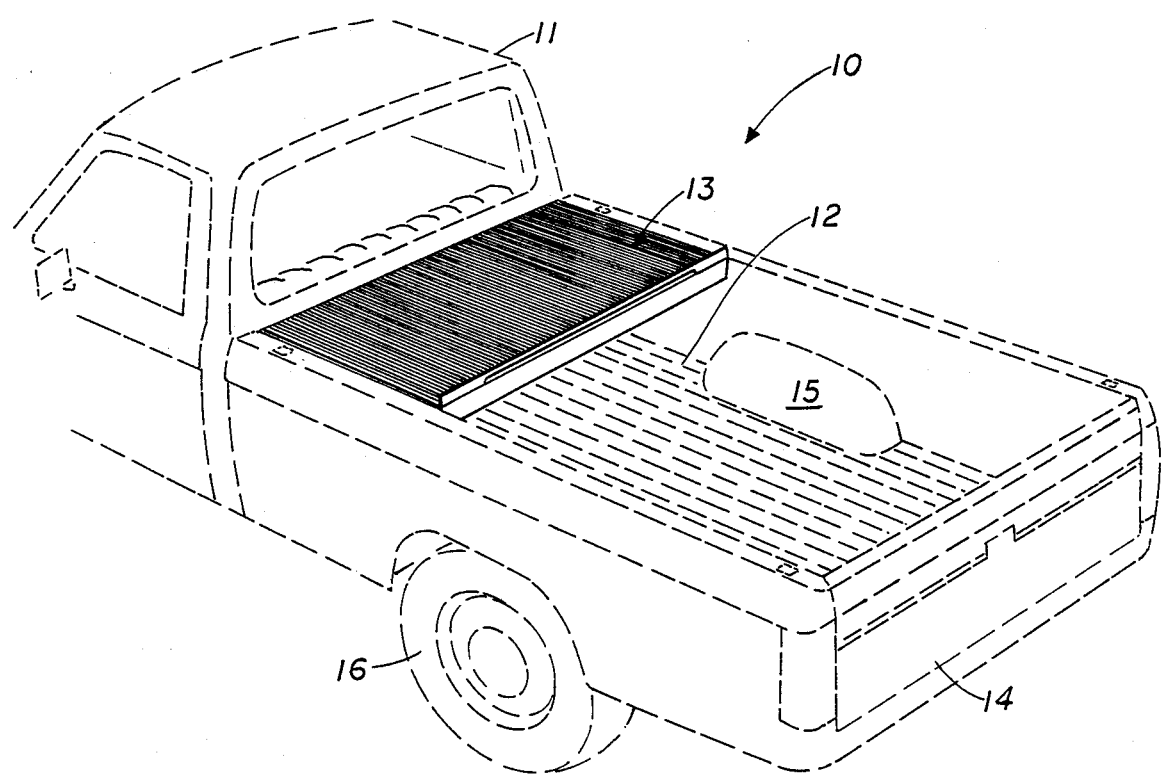
FIG. 1 is a perspective view of a conventional pick-up truck having a cover in accordance with the invention mounted thereon.

Referring now to FIG. 1 of the drawings, a conventional pick-up truck 10 is shown having a cab 11 and an open bed 12. A cover 13 in accordance with the invention is shown as installed over a portion of bed 12 between cab 11 and tail gate 14. Wheel wells 15 cover wheels 16, as is well known in the pick-up truck art, and cover 13 is shown as spaced from wells 15. However, as will be discussed, the length of cover 13 may vary and such cover 13 may extend to and over wells 15 and rest thereon.

Figure 2:
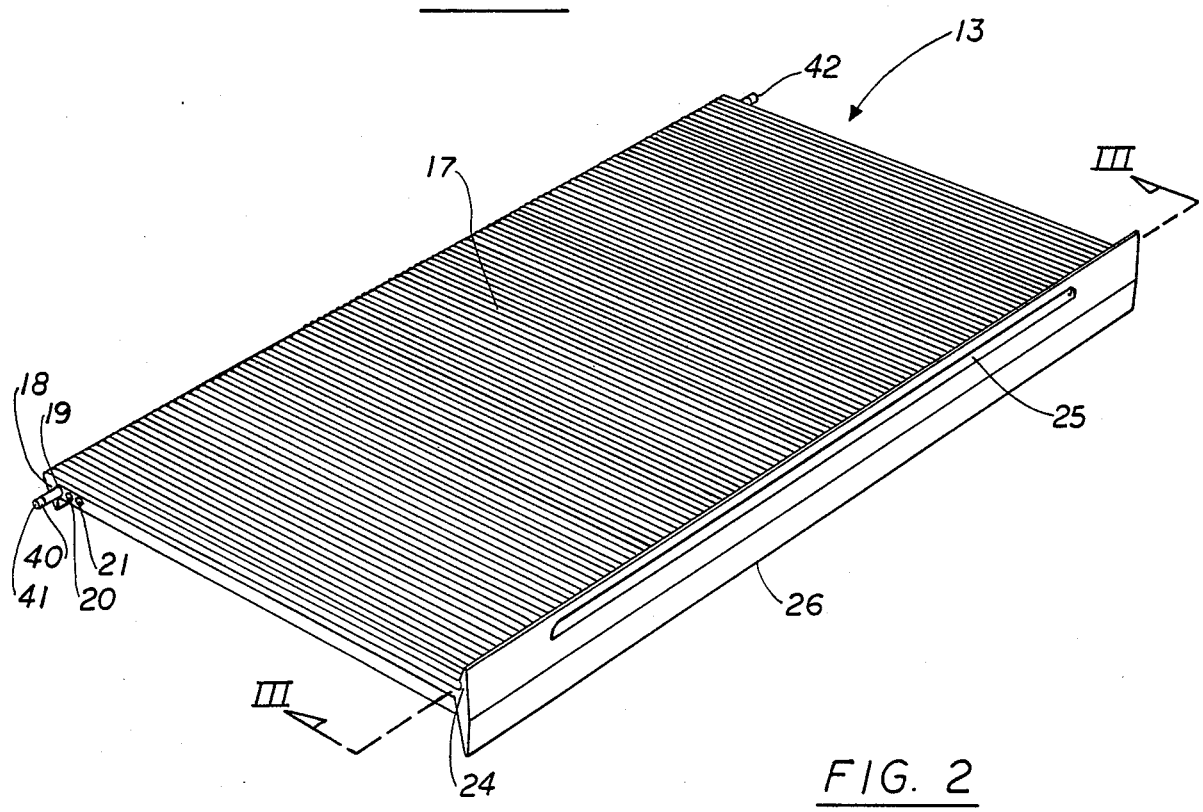
FIG. 2 is a side perspective view of the cover alone of FIG. 7 removed from the truck of FIG, 1.

Cover 13 as shown in FIG. 2 includes a generally flat planar rectangular main body portion 17 terminating at the front in a downwardly extending triangularly shaped flange 18. Flange 18 extends the entire width of main body portion 17 and has a plurality of spaced through holes, such as holes 19 to 21, extending all the way therethrough.

Figure 3:
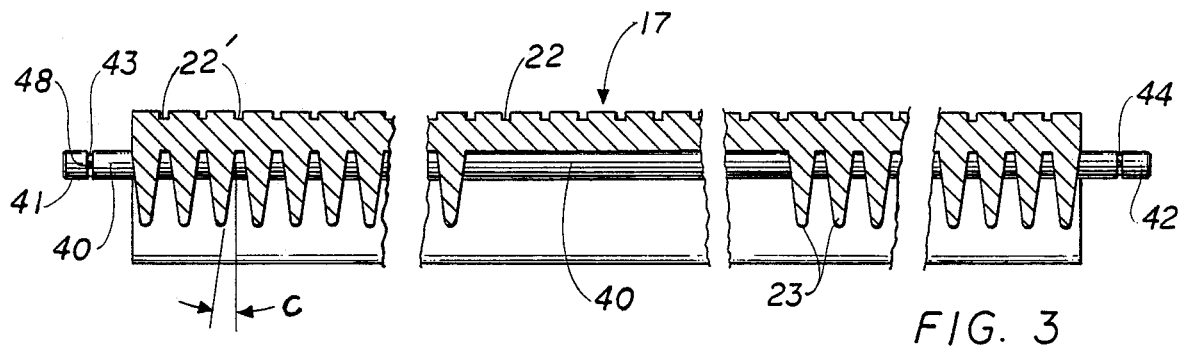
FIG. 3 is a sectional view taken along lines III—III of FIG. 2.

As seen in FIG. 3, main body portion 17 is comprised on the upper surface of a plurality of square shaped spaced longitudinally extending spaced grooves 22. The underside of main body portion 17 includes a plurality of downwardly and longitudinally extending spaced drip lips 23, which may be generally triangular in cross-section.

As seen in FIG. 3, the intersection of adjacent lips 23 are vertically aligned with a groove 22. Any suitable number of grooves 22 and lips 23 may be provided. For example, 36 grooves (18 each side) 22 may be provided and 38 drip lips 23 (19 each side). The grooves 22 are adapted to be cut or sawn vertically down each groove 22 through the intersection of adjacent lips 23. Thus, the entire main body portion 17 can be cut at each end to accommodate the width of various truck beds. The main body portion 17 is thus preferably made of any suitable easily cut or sawn material, such as ABS or PVC plastic, polyurethane, wood, etcetera. The width of main body portion 17 may be of any desirable dimension, for example, 66 inches in overall width and about 30 inches in overall length. Thus, if grooves 22' and 22" are cut, (22' being in FIG. 3) the finished width will fit a 54½" pick-up truck bed. For truck beds of even inches in width, one extra drip lip 23 can be cut off at either side. This allows cover 13 to be a maximum of ½" smaller in width than the truck bed on which it is used, which makes a snug fit.

As seen in FIG. 2, the rear end of main body portion 17 terminates in a spoiler 24 which extends across the rear thereof from one end to the other end and may also be substantially triangular in cross-section. A slotted drain opening 25 may be provided through spoiler 24 communicating with grooves 22 for draining water therefrom. Spoiler 24 also extends downwardly forming a drip lip, lower portion 26 also generally triangular in cross section and longer than the upper portion thereof, e.g., the upper portion being about 1½" high and the lower portion being about 3" long. As can be seen in FIG. 2, slot 25 is spaced inwardly from the sides of main body portion 17 so that an appreciable amount of body portion 17 can be cut off (and cut through spoiler 24) while retaining slot 25.

Figure 4:
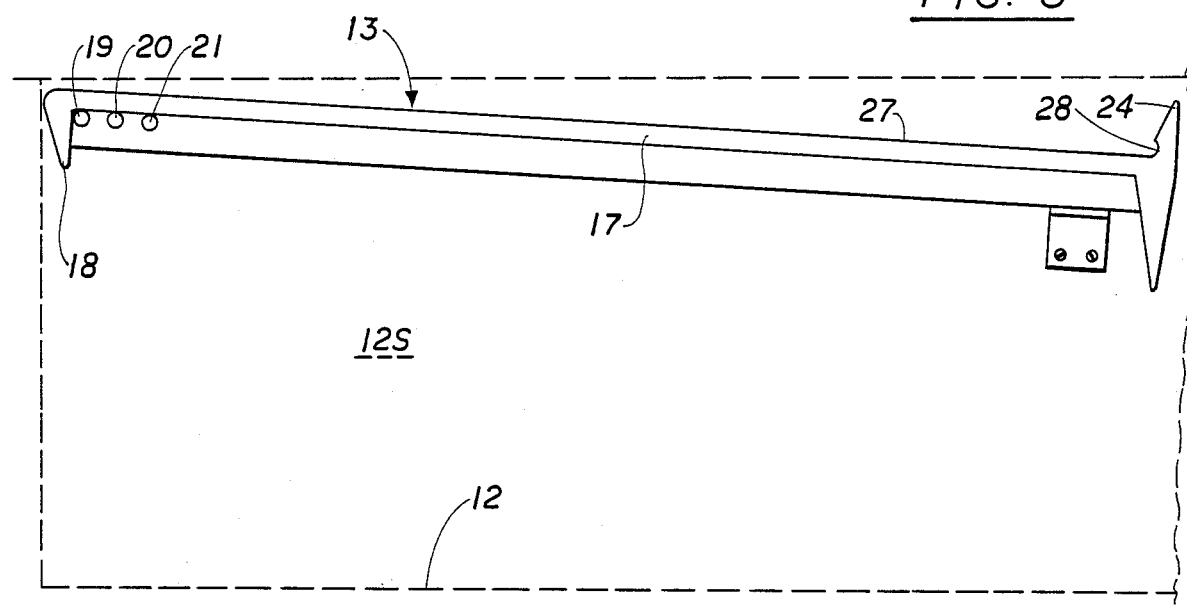
FIG. 4 is a side view of the cover alone of FIGS. 1 to 3.
Figure 12:
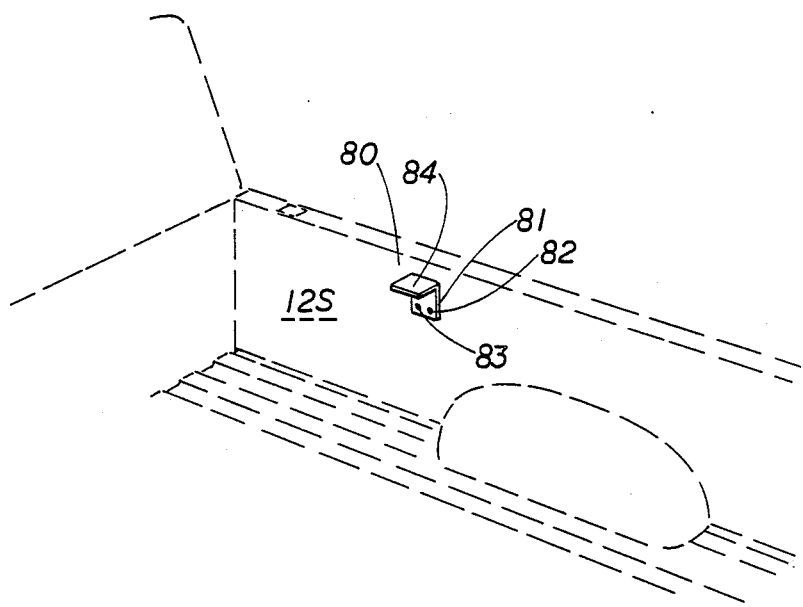
FIG. 12 is a perspective view illustrating the location of optional support brackets for the rear end of the cover of this invention.

Referring to FIG. 4, it can be seen that the intersection of the upper surface 27 of main body portion 17 and spoiler 24 is undercut or concave as at notch 28 to provide both a finger gripping area for assisting in raising and lowering cover 13 and a drain gutter. Although cover 13 can merely rest or be supported on top of the truck's wheel wells, or on top of the cargo, optional support brackets may be provided, per FIG. 12.

As seen in that figure, wherein a cutaway closeup view of one interior sidewall of the bed is shown, bracket 80 is mounted thereto. Bracket 80 includes a first vertical portion 81, and an integral horizontal portion 84 extending normally therefrom at the lower edge thereof. Portion 81 includes a pair of apertures 82, aligned with apertures not seen in sidewall 12S of truck bed. A pair of suitable bolts or sheet metal screws 83 retain the bracket 80 to sidewall 12S. Bracket 80 may be disposed such that either the spoiler 24 or the main body portion 17 rest thereupon.

Referring again to FIG. 2, an elongated rod 40 extends through one of the preselected holes 19, 20 or 21 through flange 18. In FIG. 2, hole 19 was selected. Rod 40 may be of any desired dimension, such as ⅜ inches in diameter and of steel, and terminates at each end 41, 42 in a circumferential groove, such as grooves 43, 44, respectively (see FIG. 3).

Figure 5:
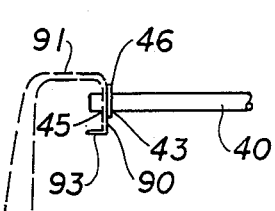
FIG. 5 and 5A is a sectional view showing the positioning of the rod of FIG. 3 in current and older model trucks.
Figure 5A:
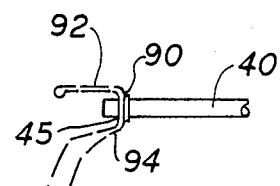

The rod ends are adapted to enter holes into upper-side lip 90 of the truck bed (see FIGS. 5 & 5A) such as hole 45 (a similar hole is provided on the other side of truck 10) receiving therein the ends 41, 42 of rod 40. See FIGS. 5 and 5A which depict the two types of walls utilized in truck bed construction. In FIG. 5, the upper lip 90 faces inwardly in that the top edge 91 of the side wall 12S faces inwardly. A small lower edge 93 extends outwardly from vertical lip 90. Whereas in FIG. 5A while lip 90 is vertical top edge 92 extends outward and bottom edge 94 joins vertical lip 90 to the sidewall 12S. Bore 45 is located in the lip 90.

Figure 6:
FIG. 6 is a perspective view of one type of securing means for the rod of FIG. 3, namely a clip.
Figure 7:
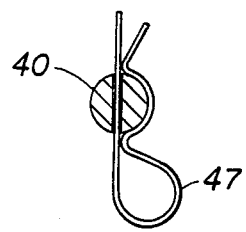
FIG. 7 is a cross-sectional view of the rod of FIG. 3 illustrating another type of securing means.

As seen in FIG. 6, a conventional resilient C-clip 46 is provided which is adapted to snap into each groove 43, 44 per FIG. 5, to retain rod 40 in a fixed pivotal position in holes 45 of the truck 10. Alternatively, a through hole 48 may be provided in each groove 43, 44 for receiving therein a conventional that is not a cotter pin 47 as seen in FIG. 7.

Figure 8:
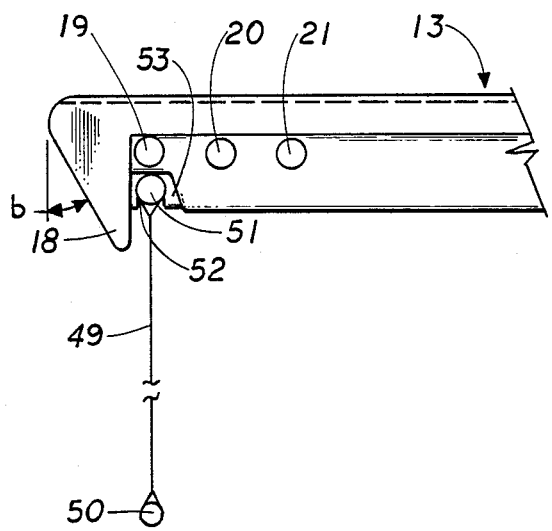
FIG. 8 is a view similar to FIG. 4 showing a modification of the invention.

As seen in FIG. 8, wherein like numerals refer to like parts of the cover 13 of FIG. 4, a water curtain 49 may be provided, which may be an imperforate flexible member, such as waterproof nylon, weighted at bottom with a plastic rod 50 attached at the other end to a ridged rod 51, which may be cut to the same width as the cover snap fitting into a slot 52 formed in a flange 53 and retained therein. Thus, when assembled to the truck body as heretofore discussed, a shield or barrier is provided between the cab 11 and the remainder of cover 13 rearwardly of flange 18 by the curtain 49. Rod 50 may also be provided with suitable end caps (not shown) and be of any suitable dimensions, such as 7/16ths inches in diameter. Rods 50 and 51 may be cut to the desired length, e.g., 1" shorter than the width of cover 13, and curtain 49 merely bunches up.

It can also be seen in FIG. 8 that groove 28 may have a gutter 54 at the bottom extending along spoiler 24. Also, the bottom portion 26 of spoiler 24 which serves as a drip lip may taper at an angle a of about 5 degrees from the vertical. In like manner flange 18 may taper at an angle b of about 30 degrees from the vertical. As seen in FIG. 3, the sides of lips 23 may taper at an angle c of about 5 degrees from the vertical.

Figure 9:
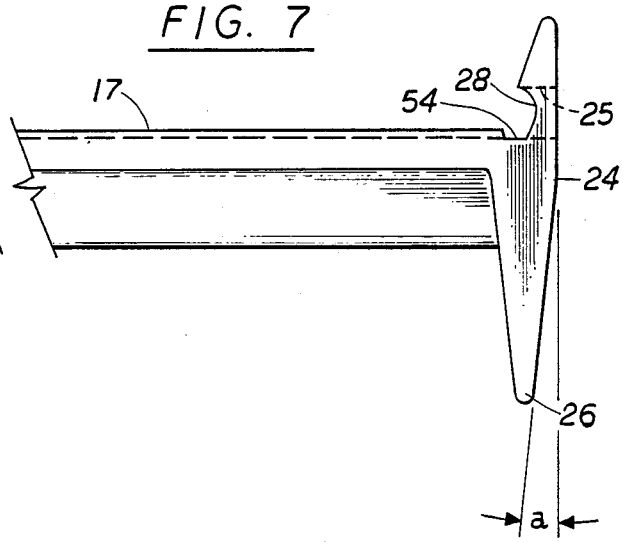
FIG. 9 is a view of a telescoping variant of the mounting rod shown in FIG. 3.
Figure 9:
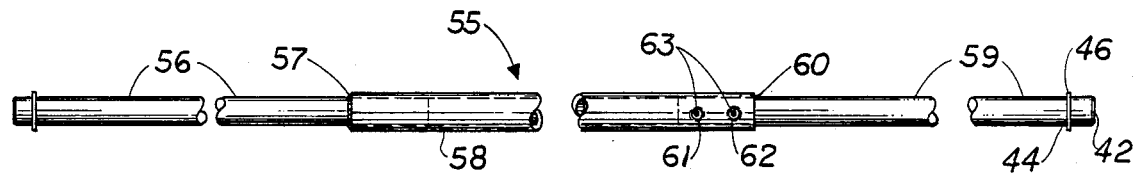

The three holes 19, 20 and 21 allow the cover 13 to be adjustably mounted since rod 40 can be inserted into any of the three holes. Of course, less or more than three such holes may be provided. Also, as seen in FIG. 9, wherein like numerals refer to like parts of the cover of FIG. 3, single piece rod 40 may be replaced by a telescoping rod assembly 55 comprised of a first end portion 56 fixedly secured, such as by welding at weld 57, to a tubular sleeve 58 and a second end rod portion 59 telescopingly received within the open end 60 of sleeve 58. Sleeve 58 is provided at the end 60 with a plurality of threaded spaced holes, such as holes 61, 62, receiving therein a set screw 63 for retaining rod portion 59 in selective positions thus accommodating rod assembly 55 to various widths of truck beds. Alternatively, rod end 59 may be threaded internally into sleeve 58 to provide such telescoping adjustment.

Figure 10:
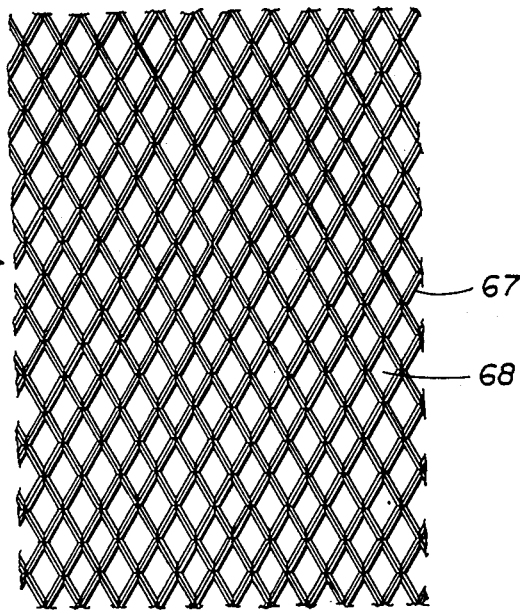
FIG. 10 is a plan view of a portion of a grid assembly that may be used in conjunction with the cover of FIGS. 1 to 9.

As seen in FIG. 10, a grid assembly 66 is shown comprised of a plurality of interlocking ribs 67 forming open diamond-shaped areas 68. Grid assembly 66 may be of plastic and cut to any suitable size, such as the width of the bed 12, and any suitable thickness, such as ½" thick, and placed under cover 13 on the floor of the bed to keep cargo or the like placed thereon off of the floor.

OPERATION

Figure 11:
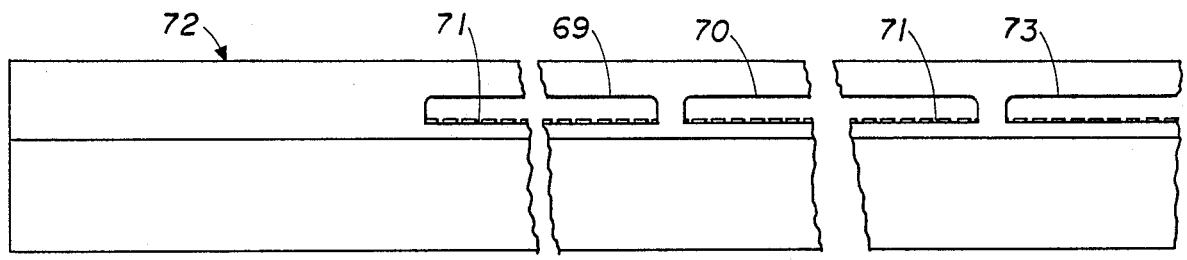
FIG. 11 is a vertical view of a portion of the rear end of cover 13 showing a modified spoiler thereon.

In operation, cover 13, having rod 40 coupled thereto, and pre-cut as heretofore discussed, is pivotally coupled to bed 12 with rod 40 entering one of the holes 19 to 21. Grid assembly 66 may be placed on the floor of the truck bed and curtain 49 is snapped in place as seen in FIG. 8. The cargo is now placed on top of grid assembly 66 and cover 13 is pivoted over the top of the cargo and rested on either the top of the cargo or the top of the wheel wells, or optional support brackets. The groove 28 assists in gripping the cover 13 at spoiler 24 to lift the same and water falling on top of cover 13 flows through slotted opening 25. Alternatively, as seen in FIG. 11, instead of a single slotted opening 25, a plurality of spaced elongated slots, such as slots 69, 70 may be provided through spoiler 72, which is otherwise identical to spoiler 24, each slot 69, 70 having a plurality of spaced notches 71 along the bottom thereof aligned with aforementioned grooves 22, so that water or the like can drain out of notches 71 and through 69 and 70 slots. Of course, only a portion of spoiler 72 is shown in FIG. 11 and more than two, such as three, slots 69, 70 may be provided.

It can be seen that cover 13 is quick and easy to install and that the cargo can be elevated off of the bed floor using grid 66. Water flows off of the cover. The angularity to the upper surface of cover 13 assists in such run off. The cover 13 pivots in place. The run off water flows out the conventional drip holes in the floor of the truck body. Water flows along channel 28 and out of slots 25 or 69 or 70. The curtain 49 protects the cargo from water when cargo is pressed against the front of the truck bed. Thus the cargo beneath the cover will stay dry therebeneath, when the cover is lifted up, water standing on cover will run to the outside of the water curtain, keeping dry any cargo pressed up against the front of the truck bed especially when it has been placed on grid 66.

Only one master unit need be manufactured in view of the ability to tailor the unit to the exact width of each manufacturer's pickup.

Although I have disclosed a specific embodiment of the invention, variations thereof may occur to an artisan and the invention is to be limited only by the scope of the appended claims.

I claim:

1. A cover for use on the open bed of a truck for partially covering the same comprising:
    a generally flat planar main body portion having a front end and a rear end, and having a flange at the front end with at least one aperture therethrough;
    a plurality of spaced elongated linearly extending grooves on the upper surface of said main body portion extending in a direction normal to the longitudinal axis of said aperture; and
    a plurality of spaced drip lips extending downwardly from the undersurface of said main body portion spaced from each other and extending linearly in the same direction as said grooves, said grooves being generally vertically aligned with the spacing between adjacent lips whereby said main body portion can be cut along said grooves generally vertically through the spacing between adjacent lips providing for variation in the overall width of said cover,
    and an elongated spoiler extending along the rear of said cover.

2. In the cover of claim 1 including a plurality of linearly extending spaced apertures through said flange.

3. In the cover of claim 1 including an elongated pivot rod extending through said aperture and an overall length greater than the overall width of said flange so that said rod extends through said flange on both sides thereof providing ends adapted to be inserted into holes on opposite sides of the side panels of a truck.

4. In the cover of claim 3 including locking means on each end of said rod for locking the same in position when inserted into holes on opposite sides of the side panels of a truck.

5. In the cover of claim 3 wherein said rod is telescopingly adjustable.

6. In the cover of claim 1 wherein said elongated spoiler on said cover extends along the rear end of said main body portion opposite said flange and in the same direction, said spoiler extending a short distance above and below the upper and under surfaces, respectively, of said main body portion.

7. In the cover of claim 6 including at least one elongated slot extending through said spoiler, said slot communicating with the upper surface of said main body portion.

8. In the cover of claim 7 including a plurality of spaced notches extending along the bottom of said slot, said notches being axially aligned with respective ones of said grooves.

9. In the cover of claim 6 including an elongated channel extending along the bottom of said spoiler where said spoiler engages the upper surface of said main body portion, said grooves opening into said channel.

10. In the cover of claim 1 including a pair of opposed spaced support brackets mountable inside the truck bed and adapted to have the rear of said cover rest thereupon.

11. In the cover of claim 10, wherein said support brackets are L-brackets.

12. In the cover of claim 11 wherein the sides of said lips are at an angle of about 5 degrees with respect to the vertical.

13. In the cover of claim 1 including a flexible curtain having a curtain rod fixed to the underside of said main body portion adjacent said flange, and extendible therefrom to a position extending generally normal to the plane of said main body portion.

14. A covered truck bed having:
    (a) a cover for partially covering said bed comprising:
        a generally flat planar main body portion having a front end and a rear end, and having a flange at the rear end with at least one aperture therethrough;
        a plurality of spaced elongated linearly extending grooves on the upper surface of said main body portion extending in a direction normal to the longitudinal axis of said aperture; and
        a plurality of spaced drip lips extending downwardly from the undersurface of said main body portion spaced from each other and extending linearly in the same direction as said grooves, said grooves being generally vertically aligned with the spacing between adjacent lips whereby said main body portion can be cut along said grooves generally vertically through the spacing between adjacent lips providing for variation in the overall width of said cover,
        and an elongated spoiler extending along the rear of said cover; and
    (b) a grid assembly sized to fit the truck bed beneath said cover on said bed to raise cargo above said bed level away from any rain that might accumulate beneath said cover.

15. A covered truck bed having;
    (a) a cover for partially covering said bed comprising;
        a generally flat planar main body portion having a front end and a rear end, and having a flange at the rear end with at least one aperture therethrough;
        a plurality of spaced elongated linearly extending grooves on the upper surface of said main body portion extending in a direction normal to the longitudinal axis of said aperture; and
        a plurality of spaced drip lips extending downwardly from the undersurface of said main body portion spaced from each other and extending linearly in the same direction as said grooves, said grooves being generally vertically aligned with the spacing between adjacent lips whereby said main body portion can be cut along said grooves generally vertically through the spacing between adjacent lips providing for variation in the overall width of said cover,
        and an elongated spoiler extending along the rear of said cover, and further including a flexible curtain having a curtain rod fixed to the underside of said main body portion adjacent said flange, and extendible therefrom to a position extending generally normal to the plane of said main body portion; and (b) a grid assembly sized to fit the truck bed beneath said cover on said bed to raise cargo above said bed level away from any rain that might accumulate beneath said cover.

16. In the cover of claim 1 wherein the front flange has a taper rearwardly of about 30 degrees from the vertical.

* * * * *